(12) United States Patent
Lu et al.

(10) Patent No.: US 8,438,380 B2
(45) Date of Patent: May 7, 2013

(54) METHOD FOR CONTROLLING REMOTE WIRELESS DEVICE WITH A USER DEVICE

(75) Inventors: Chi-Ming Lu, Taipei Hsien (TW); Dong-Ming Li, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 608 days.

(21) Appl. No.: 12/629,122

(22) Filed: Dec. 2, 2009

(65) Prior Publication Data

US 2011/0064223 A1 Mar. 17, 2011

(30) Foreign Application Priority Data

Sep. 17, 2009 (CN) .......................... 2009 1 0307183

(51) Int. Cl.
*H04L 29/06* (2006.01)
(52) U.S. Cl.
USPC .............. 713/150; 713/171; 726/14; 380/278
(58) Field of Classification Search .................. 713/150, 713/171; 726/6, 14
See application file for complete search history.

(56) References Cited

U.S. PATENT DOCUMENTS

| | | | |
|---|---|---|---|
| 7,350,077 B2 * | 3/2008 | Meier et al. ..................... | 713/171 |
| 7,383,440 B1 | 6/2008 | Miller, III et al. | |
| 2003/0072059 A1 * | 4/2003 | Thomas et al. ............... | 359/167 |
| 2004/0103282 A1 * | 5/2004 | Meier et al. ..................... | 713/171 |
| 2006/0107050 A1 * | 5/2006 | Shih ............................... | 713/171 |
| 2007/0064737 A1 * | 3/2007 | Williams ....................... | 370/473 |
| 2007/0214308 A1 * | 9/2007 | Pope et al. ..................... | 711/100 |
| 2008/0056272 A1 * | 3/2008 | Batta .......................... | 370/395.5 |
| 2008/0063204 A1 * | 3/2008 | Braskich et al. .............. | 380/270 |
| 2008/0155670 A1 * | 6/2008 | Umesawa et al. ................ | 726/6 |
| 2009/0019539 A1 * | 1/2009 | Jonnalagadda et al. ........ | 726/14 |
| 2009/0041252 A1 * | 2/2009 | Hanna ........................... | 380/278 |

FOREIGN PATENT DOCUMENTS

| | | |
|---|---|---|
| CN | 101414909 A | 4/2009 |
| TW | 200618577 A | 6/2006 |

OTHER PUBLICATIONS

Kellil, "Multicast receiver and sender access control and its applicability to mobile IP environments: a survey", 2005, IEEE, vol. 7, pp. 46-70.*

* cited by examiner

*Primary Examiner* — Taghi Arani
*Assistant Examiner* — Gregory Lane
(74) *Attorney, Agent, or Firm* — Altis Law Group, Inc.

(57) ABSTRACT

A method for controlling a remote wireless device with a user device includes the user device sending a request message packet to the remote wireless device, where the remote wireless device verifies the request message packet and sends a reply message packet to the user device if the request message packet passes verification. The user device verifies the reply message packet and sends a control message packet to the remote wireless device if the reply message packet passes verification. The remote wireless device verifies the control message packet and sends an acknowledgment message packet to the user device if the control message packet passes verification.

15 Claims, 8 Drawing Sheets

| Message Type | Fin | |
|---|---|---|
| 0x00 | 0 | Request message |
| 0x01 | 0 | Reply message |
| 0x02 | 0 | Control message |
| 0x02 | 1 | Fin message |
| 0x03 | 0 | ACK message |

FIG. 8

METHOD FOR CONTROLLING REMOTE WIRELESS DEVICE WITH A USER DEVICE

BACKGROUND

1. Technical Field

Embodiments of the present disclosure relate to remote wireless device management technology, and particularly to a method for controlling a remote wireless device with a user device.

2. Description of Related Art

Mobile phones can be used to exchange information and communicate with other remote wireless devices almost anytime and anywhere. Currently, a mobile phone can send a short message service (SMS) message to control a remote wireless device. However, the current remote wireless device can only verify an identity of a user corresponding to the mobile phone by a phone number, and the message sent to the remote wireless device is often not encrypted, which creates a security risk.

BRIEF DESCRIPTION OF THE DRAWINGS

FIG. 8 is a schematic diagram of one embodiment of message types of the TP-UD field in FIG. 7.

DETAILED DESCRIPTION

All of the processes described below may be embodied in, and fully automated via, functional code modules executed by one or more general purpose electronic devices or processors. The code modules may be stored in any type of readable medium or other storage system device. Some or all of the methods may alternatively be embodied in specialized hardware. Depending on the embodiment, the readable medium may be a hard disk drive, a compact disc, a digital video disc, or a tape drive.

Figure 1:
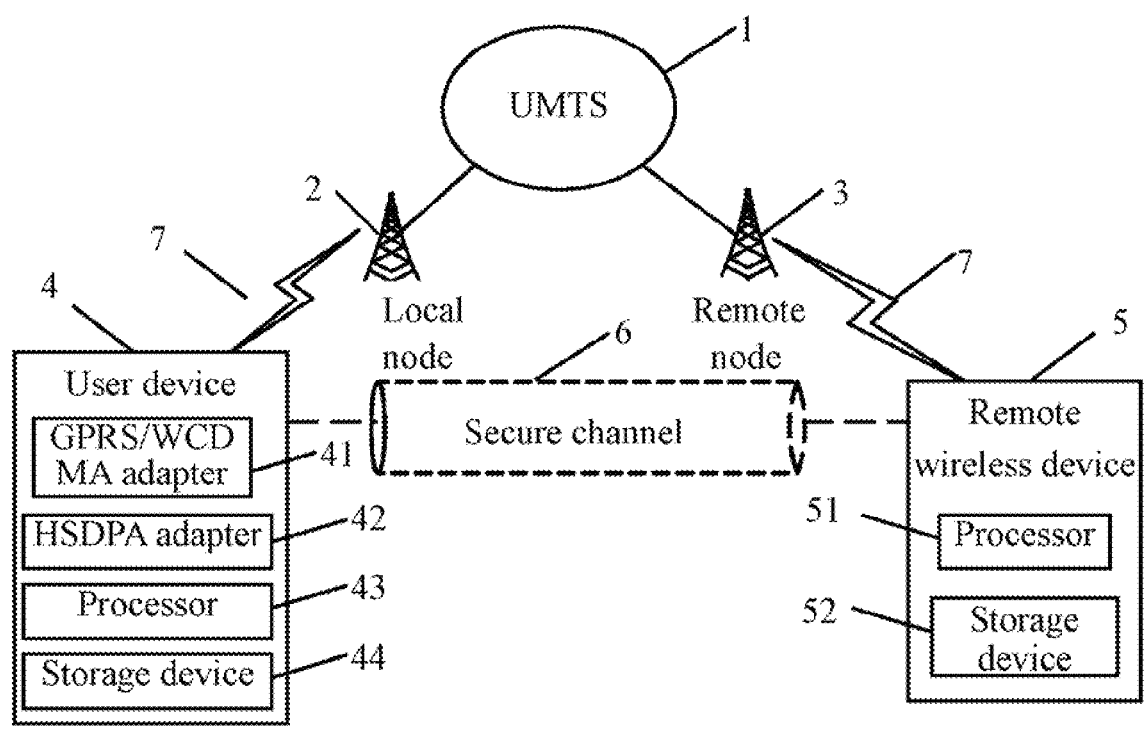
FIG. 1 is a schematic diagram of one embodiment of a method for controlling a remote wireless device with a user device.

FIG. 1 is a schematic diagram of one embodiment of a method for controlling a remote wireless device 5 with a user device 4. In one embodiment, the user device 4 is connected to a local node 2 through a wireless network 7, the remote wireless device 5 is connected to a remote node 3 through the wireless network 7, and the local node 2 is connected to the remote node 3 through a universal mobile telecommunications system (UMTS) 1. In one embodiment, the user device 4 may be a mobile phone, a digital camera, or a personal digital assistant (PDA), for example. The remote wireless device 5 may be a high speed downlink packet access (HSDPA) router, for example.

In one embodiment, a general packet radio service/wideband code division multiple access (GPRS/WCDMA) adapter 41 or a HSDPA adapter 42 is installed in the user device 4. Furthermore, the user device 4 is connected to the remote wireless device 5 through a secure channel 6 (e.g., a secure tunnel network). In one embodiment, the secure channel 6 is used to transport encrypted control messages between the user device 4 and the wireless device 5. A processor 43 of the user device 4 or a processor 51 of the remote wireless device 5 controls execution of the computerized codes of the user device 4 or the remote wireless device 5.

Figure 2:
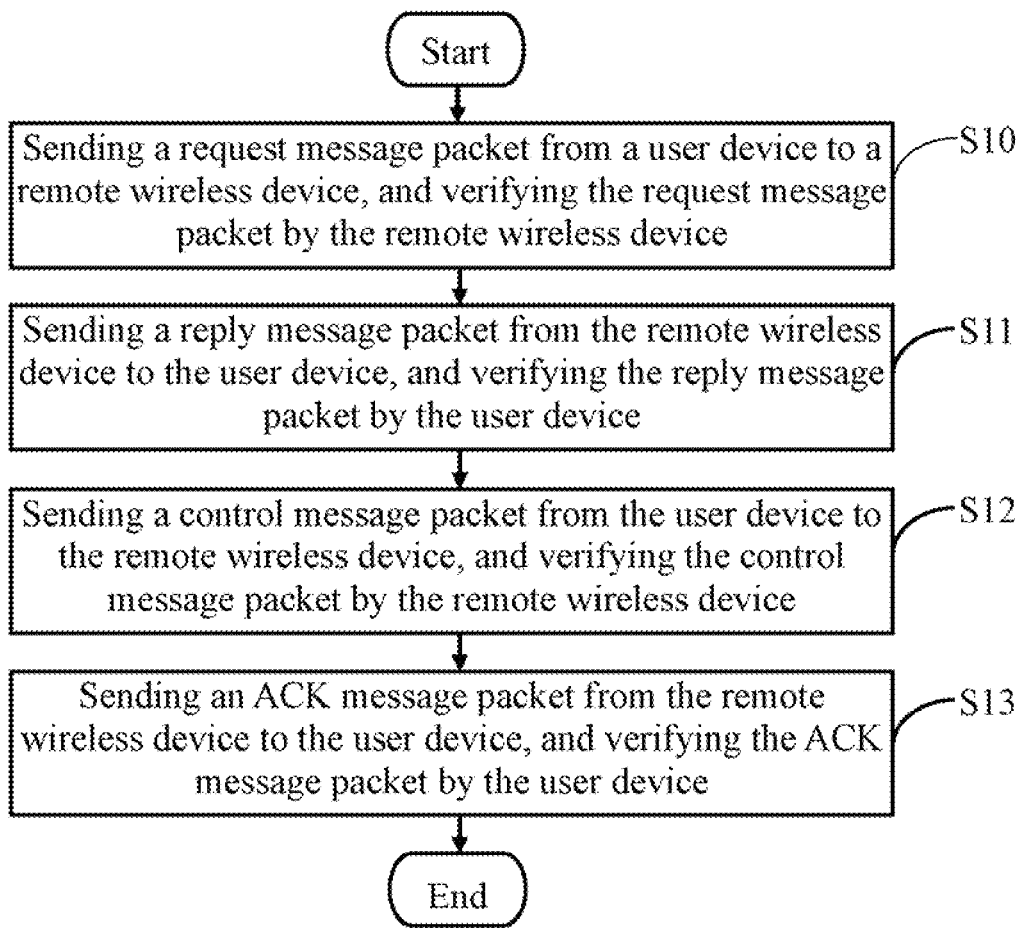
FIG. 2 is a flowchart of one embodiment of a method for controlling the remote wireless device with the user device.

FIG. 2 is a flowchart of one embodiment of a method for controlling the remote wireless device 5 with the user device 4. Depending on the embodiment, additional blocks may be added, others removed, and the ordering of the blocks may be changed.

In block S10, the user device 4 creates and sends a request message packet to the remote wireless device 5, so as to start a session between the user device 4 and the remote wireless device 5. In one embodiment, the request message packet is initialized by the user device 4. Then, the remote wireless device 5 verifies the request message packet. In one embodiment, the remote wireless device 5 and the user device 4 have the same pairwise master key (PMK). It is understood that the PMK of the remote wireless device 5 and the user device 4 are obtained from an authentication server (AS).

In block S11, the remote wireless device 5 constructs a reply message packet if the request message packet is verified to be correct, and sends the reply message packet to the user device 4. Then, the user device 4 verifies the reply message packet.

In block S12, the user device 4 constructs a control message packet and encrypts the control message packet if the reply message packet is verified to be correct, and sends the control message packet to the remote wireless device 5. Then, the remote wireless device 5 verifies the control message packet.

In block S13, the remote wireless device 5 decrypts and processes the control message packet if the control message packet is verified to be correct, and sends an acknowledgment (ACK) message packet to the user device 4. Then, the user device 4 verifies the acknowledgment message packet, and waits to send a next control message packet to the remote wireless device 5.

Figure 3:
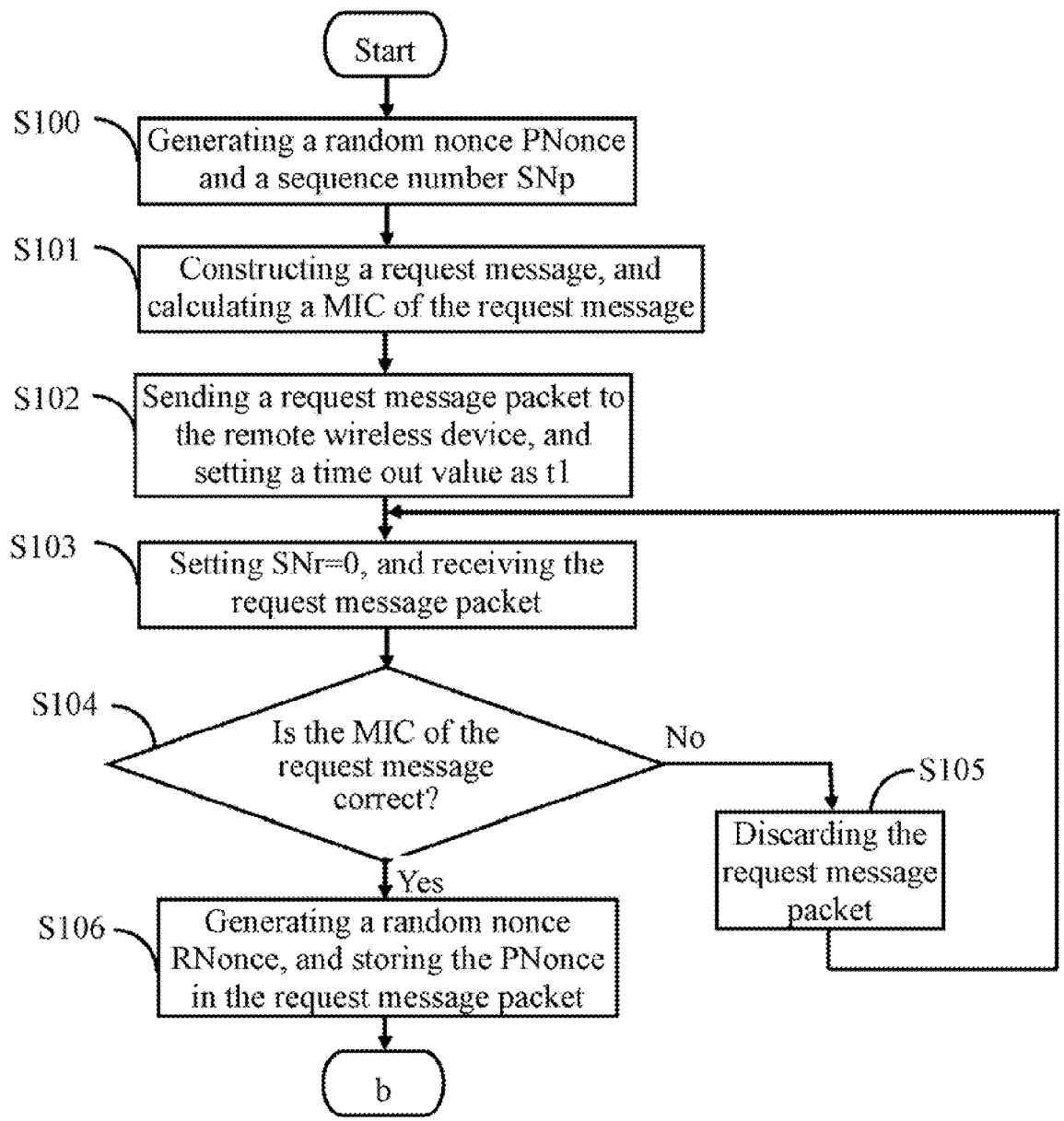
FIG. 3 is a detailed flowchart of one embodiment of block S10 in FIG. 2.

FIG. 3 is a detailed flowchart of one embodiment of block S10 in FIG. 2. Depending on the embodiment, additional blocks may be added, others removed, and the ordering of the blocks may be changed.

In block S100, the user device 4 generates a random nonce "PNonce" and a sequence number "SNp" of the user device 4, and stores the random nonce "PNonce" and the sequence number "SNp" in a storage device 44 of the user device 4. In one embodiment, the random nonce may be a random number generated by the user device 4.

In block S101, the user device 4 constructs a request message, and calculates a message integrity code (MIC) of the request message. In one example, the MIC of the request message may be calculated using a hash message authentication codes-message digest 5 (HMAC-MD5) algorithm according to parameters of the PMK of the user device 4 and the request message.

In block S102, the user device 4 sends a request message packet to the remote wireless device 5, and sets a time out value as t1. In one embodiment, the request message packet includes the request message, the sequence number "SNp" and the random nonce "PNonce" of the user device, and the MIC of the request message.

In block S103, the remote wireless device 5 sets a value of a sequence number "SNr" of the remote wireless device to zero, and receives the request message packet sent from the user device 4.

In block S104, the remote wireless device 5 determines if the MIC of the request message contained in the request message packet is correct. In one embodiment, the remote wireless device 5 calculates a new MIC of the request message using the HMAC-MD5 algorithm according to parameters of the PMK of the remote wireless device 5 and the received request message, and determines if the new MIC of the request message is equal to the received MIC of the request message.

In block S105, the remote wireless device 5 discards the request message packet if the new MIC of the request message is not equal to the received MIC of the request message, and the procedure returns to block S103 to wait for a next request message packet.

In block S106, the remote wireless device 5 generates a random nonce "RNonce" of the remote wireless device 5 if the new MIC of the request message is equal to the received MIC of the request message, and stores the random nonce "PNonce" of the user device 4 in the request message packet in a storage device 52 of the remote wireless device 5.

Figure 4:
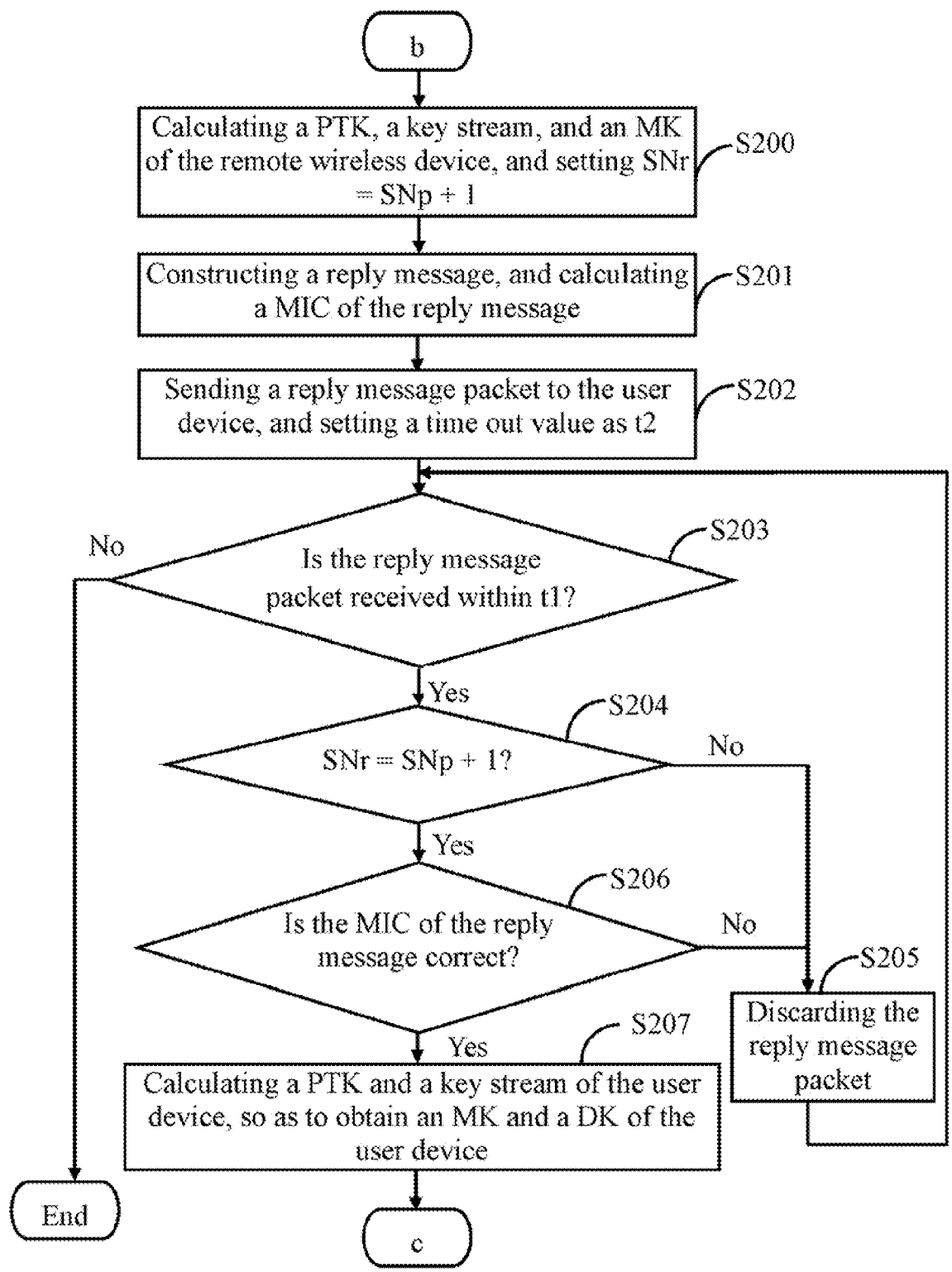
FIG. 4 is a detailed flowchart of one embodiment of block S11 in FIG. 2.

FIG. 4 is a detailed flowchart of one embodiment of block S11 in FIG. 2. Depending on the embodiment, additional blocks may be added, others removed, and the ordering of the blocks may be changed.

In block S200, firstly, the remote wireless device 5 calculates a pairwise transient key (PTK) of the remote wireless device 5 using a pseudo random function (PRF) according to parameters of the PMK and the random nonce "RNonce" of the remote wireless device 5, and the random nonce "PNonce" of the user device 4 in the request message packet. Secondly, the remote wireless device 5 calculates a key stream of the remote wireless device 5 using the PRF according to parameters of the PTK of the remote wireless device 5, the random nonce "PNonce" of the user device 4 in the request message packet, and the random nonce "RNonce" of the remote wireless device 5. Thirdly, the remote wireless device 5 samples previous sixteen bytes from the key stream (i.e., key stream octets 0 through 15), so as to obtain a MIC key (MK) of the remote wireless device 5, and sets SNr=SNp+1.

In block S201, the remote wireless device 5 constructs a reply message, and calculates a MIC of the reply message. As mentioned above, the MIC may be calculated using the HMAC-MD5 algorithm according to parameters of the PMK of the remote wireless device 5 and the replay message.

In block S202, the remote wireless device 5 sends a reply message packet to the user device 4, and sets a time out value as t2. In one embodiment, the reply message packet includes the reply message, the sequence number "SNr" and the random nonce "RNonce" of the remote wireless device 5, and the MIC of the reply message.

In block S203, the user device 4 determines if the reply message packet is received within the time out value t1. The procedure goes to block S204 if the reply message packet is received within the time out value t1, or the procedure ends if the reply message packet is not received within the time out value t1.

In block S204, the user device 4 determines if the sequence number "SNr" of the remote wireless device in the reply message packet is equal to "SNp+1." The procedure goes to block S206 if "SNr=SNp+1", or the procedure goes to block S205 if "SNr≠SNp+1".

In block S205, the user device 4 discards the reply message packet, and the procedure returns to block S203.

In block S206, the user device 4 determines if the MIC of the reply message is correct. A detailed description is as follows. Firstly, the user device 4 calculates a new MIC of the reply message using the HMAC-MD5 algorithm according to parameters of the PMK of the user device 4 and the received reply message. Secondly, the user device 4 determines if the new MIC of the reply message is equal to the received MIC of the reply message. The procedure goes to block S207 if the new MIC of the reply message is equal to the received MIC of the reply message, or the procedure returns to block S205 if the new MIC of the reply message is not equal to the received MIC of the reply message.

In block S207, firstly, the user device 4 calculates a pairwise transient key (PTK) of the user device 4 using the pseudo random function (PRF) according to parameters of the PMK and the random nonce "PNonce" of the user device 4, and the random nonce "RNonce" of the remote wireless device 5 in the reply message packet. Secondly, the user device 4 calculates a key stream of the user device 4 using the PRF according to parameters of the PTK of the user device 4, the random nonce "PNonce" of the user device 4, and the random nonce "RNonce" of the remote wireless device 5 in the reply message packet. Thirdly, the user device 4 samples previous sixteen bytes from the key stream (key stream octets 0 through 15), so as to obtain a MIC key (MK) of the user device 4, and further samples last sixteen bytes from the key stream (key stream octets 16 through 31) so as to obtain a data encryption key (DK) of the user device 4.

Figure 5:
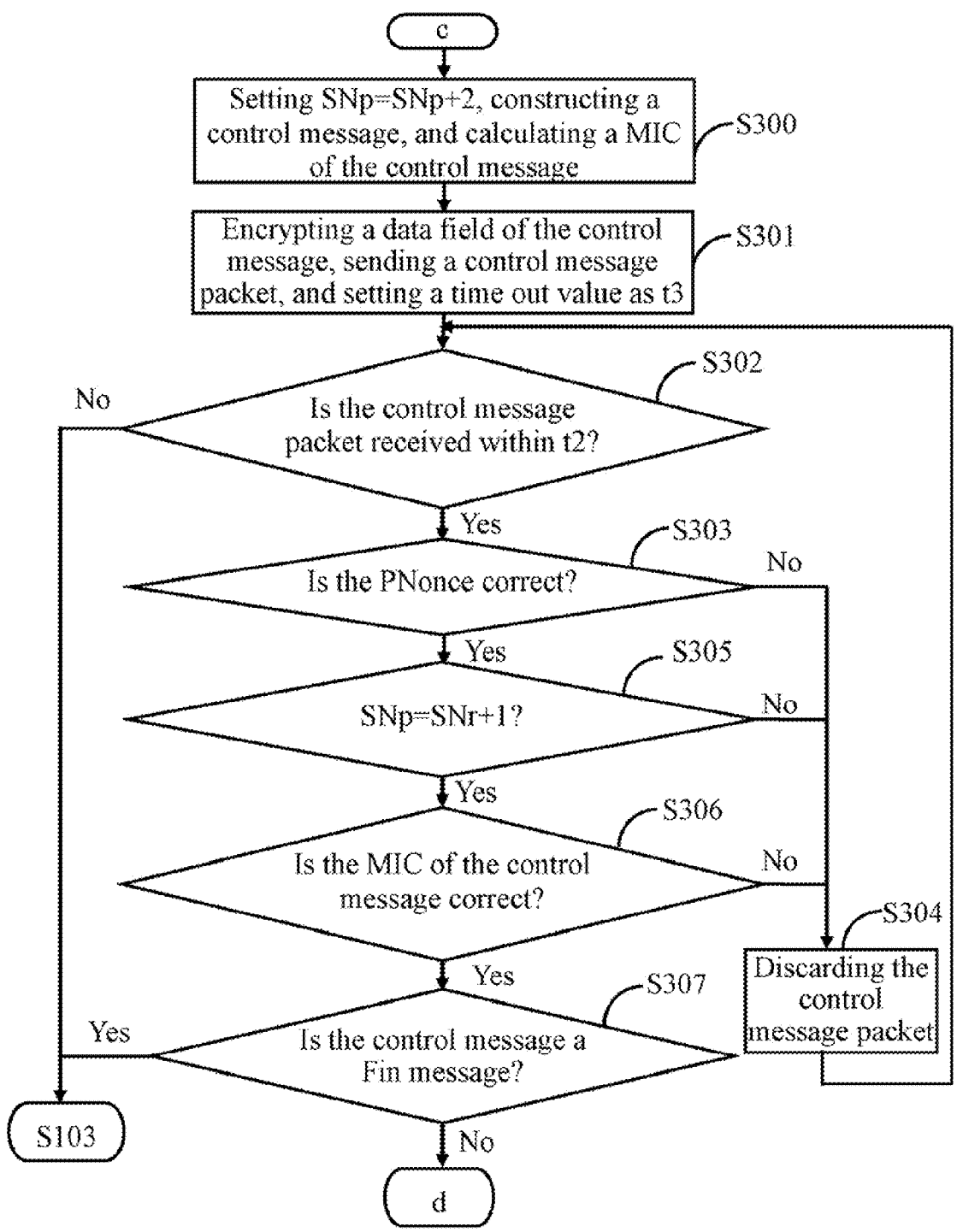
FIG. 5 is a detailed flowchart of one embodiment of block S12 in FIG. 2.

FIG. 5 is a detailed flowchart of one embodiment of block S12 in FIG. 2. Depending on the embodiment, additional blocks may be added, others removed, and the ordering of the blocks may be changed.

In block S300, the user device 4 sets the sequence number "SNp" of the user device 4 to "SNp+2", and constructs a control message. Then, the user device 4 calculates a MIC of the control message using the HMAC-MD5 algorithm according to parameters of the MIC key of the user device 4 and the control message, and encrypts a data field of the control message using the data encryption key of the user device 4.

In block S301, the user device 4 sends a control message packet to the remote wireless device 5, and sets a time out value as t3. In one embodiment, the control message packet includes the control message, the sequence number "SNp", and the random nonce "PNonce" of the user device 4, and the MIC of the control message.

In block S302, the remote wireless device 5 determines if the control message packet is received within the time out value t2. The procedure goes to block S303 if the control message packet is received within the time out value t2, or the procedure returns to block S103 if the control message packet is not received within the time out value t2.

In block S303, the remote wireless device 5 determines if the random nonce of the user device 4 in the control message packet is correct. That is to say, the remote wireless device 5 determines if the random nonce of the user device 4 in the control message packet is equal to the random nonce of the user device 4 in the request message packet. The procedure goes to block S305 if the random nonce of the user device in the control message packet is equal to the random nonce of the user device in the request message packet, or the procedure goes to block S304 if the random nonce of the user device in the control message packet is not equal to the random nonce of the user device in the request message packet.

In block S304, the remote wireless device 5 discards the control message packet, and the procedure returns to block S302.

In block S305, the remote wireless device 5 determines if the sequence number "SNp" of the user device 4 in the control message packet is equal to "SNr+1." The procedure goes to block S306 if "SNp=SNr+1", or the procedure goes to block S304 if "SNp≠SNr+1".

In block S306, the remote wireless device 5 determines if the MIC of the control message is correct. A detailed description is as follows. Firstly, the remote wireless device 5 calculates a new MIC of the control message using the HMAC-MD5 algorithm according to parameters of the MIC key of the remote wireless device 5 and the received control message. Secondly, the remote wireless device 5 determines if the new MIC of the control message is equal to the received MIC of the control message. The procedure goes to block S307 if the new MIC of the control message is equal to the received MIC of the control message, or the procedure goes to block S304 if the new MIC of the control message is not equal to the received MIC of the control message.

In block S307, the remote wireless device 5 determines if the control message is a Fin message, and the procedure goes to block S13 if the control message is not the Fin message, or the procedure returns to block S103 if the control message is the Fin message. In one embodiment, the Fin message is an end bit in a message (e.g., the control message).

Figure 6:
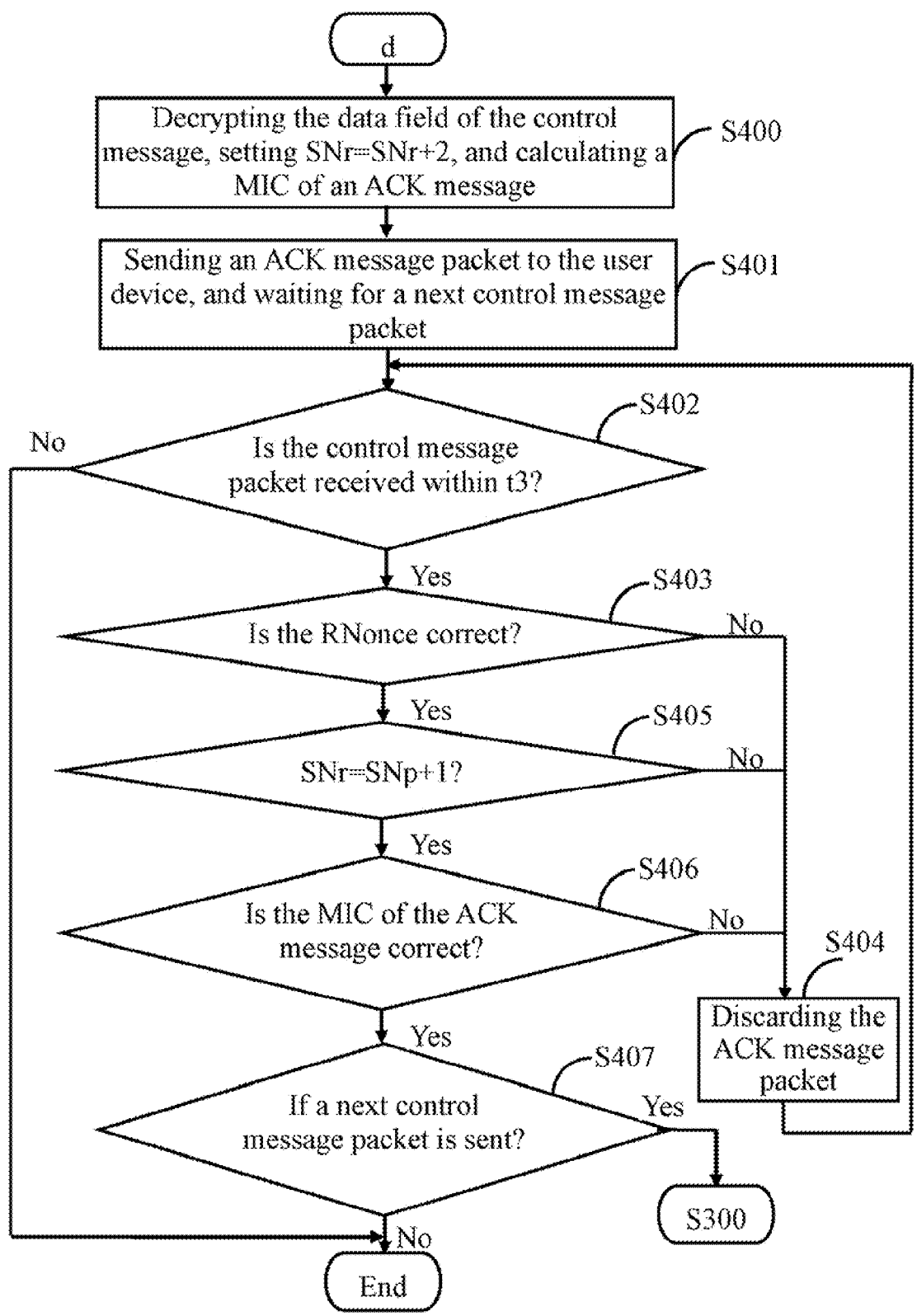
FIG. 6 is a detailed flowchart of one embodiment of block S13 in FIG. 2.

FIG. 6 is a detailed flowchart of one embodiment of block S13 in FIG. 2. Depending on the embodiment, additional blocks may be added, others removed, and the ordering of the blocks may be changed.

In block S400, the remote wireless device 5 decrypts the data field of the control message, sets the sequence number "SNr" of the remote wireless device 5 to "SNr+2", and constructs an acknowledgment (ACK) message. Then, the remote wireless device 5 calculates a MIC of the ACK message using the HMAC-MD5 algorithm according to parameters of the MIC key of the remote wireless device 5 and the ACK message.

In block S401, the remote wireless device 5 sends an ACK message packet to the user device 4, and waits for a next control message packet sent from the user device 4. In one embodiment, the ACK message packet includes the ACK message, the sequence number "SNr", and the random nonce "RNonce" of the remote wireless device 5, and the MIC of the ACK message.

In block S402, the user device 4 determines if the ACK message packet is received within the time out value t3. The procedure goes to block S403 if the ACK message packet is received within the time out value t3, or the procedure ends if the ACK message packet is not received within the time out value t3.

In block S403, the user device 4 determines if the random nonce of the remote wireless device 5 in the ACK message packet is correct. That is to say, the user device 4 determines if the random nonce of the remote wireless device 5 in the ACK message packet is equal to the random nonce of the remote wireless device 5 in the reply message packet. The procedure goes to block S405 if the random nonce of the remote wireless device 5 in the ACK message packet is equal to the random nonce of the remote wireless device 5 in the reply message packet, or the procedure goes to block S404 if the random nonce of the remote wireless device 5 in the ACK message packet is not equal to the random nonce of the remote wireless device 5 in the reply message packet.

In block S404, the user device 4 discards the ACK message packet, and the procedure returns to block S402.

In block S405, the user device 4 determines if the sequence number "SNr" of the remote wireless device 5 in the ACK message packet is equal to "SNp+1." The procedure goes to block S406 if "SNr=SNp+1", or the procedure goes to block S404 if "SNr≠SNp+1".

In block S406, the user device 4 determines if the MIC of the ACK message is correct. A detailed description is as follows. Firstly, the user device 4 calculates a new MIC of the ACK message using the HMAC-MD5 algorithm according to parameters of the MIC key of the user device 4 and the received ACK message. Secondly, the user device 4 determines if the new MIC of the ACK message is equal to the received MIC of the ACK message. The procedure goes to block S407 if the new MIC of the ACK message is equal to the received MIC of the ACK message, or the procedure goes to block S404 if the new MIC of the ACK message is not equal to the received MIC of the ACK message.

In block S407, the user device 4 determines if a next control message packet is sent to the remote wireless device 5. The procedure returns to block S300 if a next control message packet is sent to the remote wireless device 5, or the procedure ends if no control message packet is sent to the remote wireless device 5.

Figure 7:
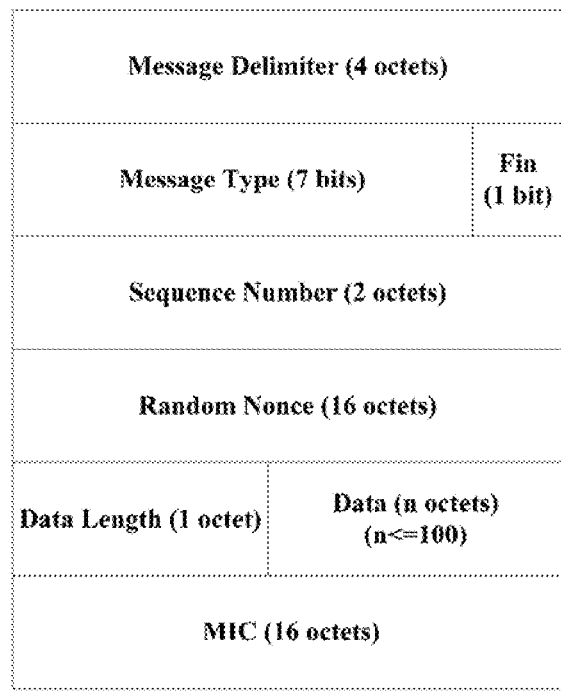
FIG. 7 is a schematic diagram of one embodiment of a TP-UD field in a transport protocol data unit of a short message service (SMS) message.

FIG. 7 is a schematic diagram of one embodiment of a TP-UD field in a transport protocol data unit of a short message service (SMS) message.

In one embodiment, the request message packet, the reply message packet, the control message packet, and the ACK message packet are sent by SMS message. Referring to FIG. 7, a message delimiter of a TP-UD field in the SMS message is used to distinguish a normal SMS message and the SMS message used in the above-mentioned method. In one embodiment, a default value of the message delimiter of the TP-UD field in the SMS message is as follows: [0xA0, 0xA1, 0xC0, 0xC1].

FIG. 8 is a schematic diagram of one embodiment of message types of the TP-UD field in FIG. 7.

An example of the message types of the TP-UD field in FIG. 7 are shown in FIG. 8. In one embodiment, a message type of a request message is "0x00", and a Fin value of the request message is zero. A message type of a reply message is "0x01", and a Fin value of the reply message is zero. A message type of a control message is "0x02", and a Fin value of the control message is zero. A message type of a Fin message is "0x02", and a Fin value of the request message is one. A message type of an ACK message is "0x03", and a Fin value of the ACK message is zero.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling a remote wireless device with a user device, the method comprising:
   a pairwise master key(PMK);
   (a) creating and sending a request message packet to the remote wireless device by the user device, and verifying the request message packet by the remote wireless device, wherein the remote wireless device and the user device have the same pairwise master key (PMK), the request message packet comprising a random nonce of the user device; and wherein constructing a request message by the user device, and calculating a message integrity code (MIC) of the request message using a HMAC-MD5 algorithm according to parameters of the PMK of the user device and the request message;

(b) constructing a reply message packet by the remote wireless device if the request message packet is verified to be correct, sending the reply message packet to the user device, and verifying the reply message packet by the user device, the reply message packet comprising a random nonce of the remote wireless device;

(c) constructing and encrypting a control message packet by the user device if the reply message packet is verified to be correct, sending the control message packet to the remote wireless device, the control message packet comprising the random nonce of the user device, and verifying the control message packet by the remote wireless device when the random nonce of the user device in the control message packet is verified to be correct, the random nonce of the user device in the control message packet is verified to be correct upon the condition that the random nonce of the user device in the control message packet is equal to the random nonce of the user device in the request message packet;

(d) decrypting and processing the control message packet by the remote wireless device if the control message packet is verified to be correct, sending an acknowledgment message packet to the user device, the ACK message packet comprising the random nonce of the remote wireless device, verifying the acknowledgment message packet by the user device when the random nonce of the remote wireless device in the ACK message packet is verified to be correct, and waiting to send a next control message packet to the remote wireless device, the random nonce of the remote wireless device in the ACK message packet is verified to be correct upon the condition that the random nonce of the remote wireless device in the ACK message packet is equal to the random nonce of the remote wireless device in the reply message packet.

2. The method according to claim 1, wherein block (a) comprises:

(a1) generating a random nonce "PNonce" and a sequence number "SNp" of the user device;

(a3) sending a request message packet to the remote wireless device, and setting a time out value as t1, wherein the request message packet comprises the request message, the sequence number "SNp" and the random nonce "PNonce" of the user device, and the MIC of the request message;

(a4) setting a value of a sequence number "SNr" of the remote wireless device to zero by the remote wireless device, and receiving the request message packet sent from the user device;

(a5) calculating a new MIC of the request message using the HMAC-MD5 algorithm according to parameters of the PMK of the remote wireless device and the received request message, determining if the new MIC of the request message is equal to the received MIC of the request message;

(a6) discarding the request message packet by the remote wireless device if the new MIC of the request message is not equal to the received MIC of the request message, and the procedure returning to block (a4);

(a7) generating a random nonce "RNonce" of the remote wireless device if the new MIC of the request message is equal to the received MIC of the request message, and storing the random nonce "PNonce" of the user device in the request message packet in the remote wireless device.

3. The method according to claim 2, wherein block (b) comprises:

(b1) calculating a pairwise transient key (PTK) of the remote wireless device using a pseudo random function (PRF) according to parameters of the PMK and the random nonce "RNonce" of the remote wireless device, and the random nonce "PNonce" of the user device in the request message packet;

(b2) calculating a key stream of the remote wireless device using the PRF according to parameters of the PTK of the remote wireless device, the random nonce "PNonce" of the user device in the request message packet, and the random nonce "RNonce" of the remote wireless device, sampling previous sixteen bytes from the key stream so as to obtain a MIC key of the remote wireless device, and setting SNr=SNp+1;

(b3) constructing a reply message by the remote wireless device, and calculating a MIC of the reply message using the HMAC-MD5 algorithm according to parameters of the PMK of the remote wireless device and the replay message;

(b4) sending a reply message packet to the user device, and setting a time out value as t2, wherein the reply message packet comprises the reply message, the sequence number "SNr" and the random nonce "RNonce" of the remote wireless device, and the MIC of the reply message;

(b5) determining if the reply message packet is received within the time out value t1 by the user device, and the procedure going to block (b6) if the reply message packet is received within the time out value t1, or the procedure ending if the reply message packet is not received within the time out value t1;

(b6) determining if the sequence number "SNr" of the remote wireless device in the reply message packet is equal to "SNp+1", and the procedure going to block (b8) if "SNr=SNp+1", or the procedure going to block (b7) if "SNr≠SNp+1";

(b7) discarding the reply message packet by the user device, and the procedure returning to block (b5);

(b8) calculating a new MIC of the reply message using the HMAC-MD5 algorithm according to parameters of the PMK of the user device and the received reply message, determining if the new MIC of the reply message is equal to the received MIC of the reply message, and the procedure going to block (b9) if the new MIC of the reply message is equal to the received MIC of the reply message, or the procedure going to block (b7) if the new MIC of the reply message is not equal to the received MIC of the reply message;

(b9) calculating a pairwise transient key (PTK) of the user device using the pseudo random function (PRF) according to parameters of the PMK and the random nonce "PNonce" of the user device, and the random nonce "RNonce" of the remote wireless device in the reply message packet;

(b10) calculating a key stream of the user device using the PRF according to parameters of the PTK of the user device, the random nonce "PNonce" of the user device, and the random nonce "RNonce" of the remote wireless device in the reply message packet, sampling previous sixteen bytes from the key stream so as to obtain a MIC key of the user device, and further sampling last sixteen bytes from the key stream so as to obtain a data encryption key of the user device.

4. The method according to claim 3, wherein block (c) comprises:
(c1) setting the sequence number "SNp" of the user device to "SNp+2", constructing a control message by the user device, calculating a MIC of the control message using the HMAC-MD5 algorithm according to parameters of the MIC key of the user device and the control message, and encrypting a data field of the control message using data encryption key of the user device;
(c2) sending a control message packet to the remote wireless device, and setting a time out value as t3, wherein the control message packet comprises the control message, the sequence number "SNp", and the random nonce "PNonce" of the user device, and the MIC of the control message;
(c3) determining if the control message packet is received within the time out value t2 by the remote wireless device, and the procedure going to block (b4) if the control message packet is received within the time out value t2, or the procedure returning to block (a4) if the control message packet is not received within the time out value t2;
(c4) determining if the random nonce of the user device in the control message packet is equal to the random nonce of the user device in the request message packet, and the procedure going to block (c6) if the random nonce of the user device in the control message packet is equal to the random nonce of the user device in the request message packet, or the procedure going to block (c5) if the random nonce of the user device in the control message packet is not equal to the random nonce of the user device in the request message packet;
(c5) discarding the control message packet by the remote wireless device, and the procedure returning to block (c3);
(c6) determining if the sequence number "SNp" of the user device in the control message packet is equal to "SNr+1", and the procedure going to block (c7) if "SNp=SNr+1", or the procedure going to block (c5) if "SNp≠SNr+1";
(c7) calculating a new MIC of the control message using the HMAC-MD5 algorithm according to parameters of the MIC key of the remote wireless device and the received control message, determining if the new MIC of the control message is equal to the received MIC of the control message, and the procedure going to block (c8) if the new MIC of the control message is equal to the received MIC of the control message, or the procedure going to block (c5) if the new MIC of the control message is not equal to the received MIC of the control message;
(c8) determining if the control message is a Fin message, and the procedure going to block (d) if the control message is not the Fin message, or the procedure returning to block (a4) if the control message is the Fin message.

5. The method according to claim 4, wherein block (d) comprises:
(d1) decrypting the data field of the control message, setting the sequence number "SNr" of the remote wireless device to "SNr+2", constructing an acknowledgment (ACK) message by the remote wireless device, calculating a MIC of the ACK message using the HMAC-MD5 algorithm according to parameters of the MIC key of the remote wireless device and the ACK message;
(d2) sending an ACK message packet to the user device, and waiting for a next control message packet, wherein the ACK message packet comprises the ACK message, the sequence number "SNr", and the random nonce "RNonce" of the remote wireless device, and the MIC of the ACK message;
(d3) determining if the ACK message packet is received within the time out value t3 by the user device, and the procedure going to block (d4) if the ACK message packet is received within the time out value t3, or the procedure ending if the ACK message packet is not received within the time out value t3;
(d4) determining if the random nonce of the remote wireless device in the ACK message packet is equal to the random nonce of the remote wireless device in the reply message packet, and the procedure going to block (d6) if the random nonce of the remote wireless device in the ACK message packet is equal to the random nonce of the remote wireless device in the reply message packet, or the procedure going to block (d5) if the random nonce of the remote wireless device in the ACK message packet is not equal to the random nonce of the remote wireless device in the reply message packet;
(d5) discarding the ACK message packet by the user device, and the procedure returning to block (d3);
(d6) determining if the sequence number "SNr" of the remote wireless device in the ACK message packet is equal to "SNp+1", and the procedure going to block (d7) if "SNr=SNp+1", or the procedure going to block (d5) if "SNr≠SNp+1";
(d7) calculating a new MIC of the ACK message using the HMAC-MD5 algorithm according to parameters of the MIC key of the user device and the received ACK message, determining if the new MIC of the ACK message is equal to the received MIC of the ACK message, and the procedure going to block (d8) if the new MIC of the ACK message is equal to the received MIC of the ACK message, or the procedure going to block (d5) if the new MIC of the ACK message is not equal to the received MIC of the ACK message;
(d8) determining if a next control message packet is sent to the remote wireless device, and the procedure returning to block (c1) if a next control message packet is sent to the remote wireless device, or the procedure ending if no control message packet is sent to the remote wireless device.

6. A user device having stored thereon instructions that, when executed by a processor of the user device, cause the processor to perform a method for controlling a remote wireless device, the method comprising:
a pairwise master key(PMK);
(a) creating and sending a request message packet to the remote wireless device, wherein the remote wireless device and the user device having the same pairwise master key (PMK); and wherein constructing a request message by the user device, and calculating a message integrity code (MIC) of the request message using a HMAC-MD5 algorithm according to parameters of the PMK of the user device and the request message;
(b) receiving a reply message packet sent from the remote wireless device, and verifying the reply message packet, the reply message packet comprising a random nonce of the remote wireless device;
(c) constructing and encrypting a control message packet if the reply message packet is verified to be correct, sending the control message packet to the remote wireless device;

(d) receiving an acknowledgment (ACK) message packet sent from the remote wireless device, the ACK message packet comprising the random nonce of the remote wireless device, verifying the acknowledgment message packet when the random nonce of the remote wireless device in the ACK message packet is verified to be correct, and waiting to send a next control message packet to the remote wireless device, the random nonce of the remote wireless device in the ACK message packet is verified to be correct upon the condition that the random nonce of the remote wireless device in the ACK message packet is equal to the random nonce of the remote wireless device in the reply message packet.

7. The user device according to claim 6, wherein block (a) comprises:
(a1) generating a random nonce "PNonce" and a sequence number "SNp" of the user device;
(a3) sending a request message packet to the remote wireless device, and setting a time out value as t1, wherein the request message packet comprises the request message, the sequence number "SNp", and the random nonce "PNonce" of the user device, and the MIC of the request message.

8. The user device according to claim 7, wherein block (b) comprises:
(b1) receiving a reply message packet sent from the remote wireless device, wherein the reply message packet comprises a reply message, a sequence number "SNr", and a random nonce "RNonce" of the remote wireless device, and a message integrity code (MIC) of the reply message;
(b2) determining if the reply message packet is received within a time out value t1, and the procedure going to block (b3) if the reply message packet is received within the time out value t1, or the procedure ending if the reply message packet is not received within the time out value t1;
(b3) determining if the sequence number "SNr" of the remote wireless device in the reply message packet is equal to "SNp+1", and the procedure going to block (b5) if "SNr=SNp+1", or the procedure going to block (b4) if "SNr≠SNp+1";
(b4) discarding the reply message packet, and the procedure returning to block (b2);
(b5) calculating a new MIC of the reply message using a HMAC-MD5 algorithm according to parameters of the PMK of the user device and the received reply message, determining if the new MIC of the reply message is equal to the received MIC of the reply message, and the procedure going to block (b6) if the new MIC of the reply message is equal to the received MIC of the reply message, or the procedure going to block (b4) if the new MIC of the reply message is not equal to the received MIC of the reply message;
(b6) calculating a pairwise transient key (PTK) of the user device using a pseudo random function (PRF) according to parameters of the PMK and the random nonce "PNonce" of the user device, and the random nonce "RNonce" of the remote wireless device in the reply message packet;
(b7) calculating a key stream of the user device using the PRF according to parameters of the PTK of the user device, the random nonce "PNonce" of the user device, and the random nonce "RNonce" of the remote wireless device in the reply message packet, sampling previous sixteen bytes from the key stream so as to obtain a MIC key of the user device, and further sampling last sixteen bytes from the key stream so as to obtain a data encryption key of the user device.

9. The user device according to claim 8, wherein block (c) comprises:
(c1) setting the sequence number "SNp" of the user device to "SNp+2", constructing a control message, calculating a MIC of the control message using the HMAC-MD5 algorithm according to parameters of the MIC key of the user device and the control message, and encrypting a data field of the control message using data encryption key of the user device;
(c2) sending a control message packet to the remote wireless device, and setting a time out value as t3, wherein the control message packet comprises the control message, the sequence number "SNp", and the random nonce "PNonce" of the user device, and the MIC of the control message.

10. The user device according to claim 9, wherein block (d) comprises:
(d1) receiving an acknowledgment (ACK) message packet sent from the remote wireless device, wherein the ACK message packet comprises a ACK message, a sequence number "SNr", and a random nonce "RNonce" of the remote wireless device, and a MIC of the ACK message;
(d2) determining if the ACK message packet is received within the time out value t3, and the procedure going to block (d3) if the ACK message packet is received within the time out value t3, or the procedure ending if the ACK message packet is not received within the time out value t3;
(d3) determining if the random nonce of the remote wireless device in the ACK message packet is equal to the random nonce of the remote wireless device in the reply message packet, and the procedure going to block (d5) if the random nonce of the remote wireless device in the ACK message packet is equal to the random nonce of the remote wireless device in the reply message packet, or the procedure going to block (d4) if the random nonce of the remote wireless device in the ACK message packet is not equal to the random nonce of the remote wireless device in the reply message packet;
(d4) discarding the ACK message packet, and the procedure returning to block (d2);
(d5) determining if the sequence number "SNr" of the remote wireless device in the ACK message packet is equal to "SNp+1", and the procedure going to block (d6) if "SNr=SNp+1", or the procedure going to block (d4) if "SNr≠SNp+1";
(d6) calculating a new MIC of the ACK message using the HMAC-MD5 algorithm according to parameters of the MIC key of the user device and the received ACK message, determining if the new MIC of the ACK message is equal to the received MIC of the ACK message, and the procedure going to block (d7) if the new MIC of the ACK message is equal to the received MIC of the ACK message, or the procedure going to block (d4) if the new MIC of the ACK message is not equal to the received MIC of the ACK message;
(d7) determining if a next control message packet is sent to the remote wireless device, and the procedure returning to block (c1) if a next control message packet is sent to the remote wireless device, or the procedure ending if no control message packet is sent to the remote wireless device.

11. A remote wireless device having stored thereon instructions that, when executed by a processor of the remote wireless device, cause the processor to perform a method for communication with a user device, the method comprising:
a pairwise master key(PMK);
(a) receiving a request message packet sent from the user device, and verifying the request message packet, wherein the remote wireless device and the user device having the same pairwise master key (PMK), the request message packet comprising a random nonce of the user device; and wherein constructing a request message by the user device, and calculating a message integrity code (MIC) of the request message using a HMAC-MD5 algorithm according to parameters of the PMK of the user device and the request message;
(b) constructing a reply message packet if the request message packet is verified to be correct, sending the reply message packet to the user device;
(c) receiving a control message packet sent from the user device, the control message packet comprising the random nonce of the user device, and verifying the control message packet when the random nonce of the user device in the control message packet is verified to be correct, the random nonce of the user device in the control message packet is verified to be correct upon the condition that the random nonce of the user device in the control message packet is equal to the random nonce of the user device in the request message packet;
(d) decrypting and processing the control message packet if the control message packet is verified to be correct, sending an acknowledgment message packet to the user device, and waiting for receiving a next control message sent from the user device.

12. The remote wireless device according to claim 11, wherein block (a) comprises:
(a1) setting a value of a sequence number "SNr" of the remote wireless device to zero, and receiving a request message packet sent from the user device, wherein the request message packet comprises a request message, a sequence number "SNp", and a random nonce "PNonce" of the user device, and a message integrity code (MIC) of the request message;
(a2) calculating a new MIC of the request message using a HMAC-MD5 algorithm according to parameters of the PMK of the remote wireless device and the received request message, determining if the new MIC of the request message is equal to the received MIC of the request message;
(a3) discarding the request message packet by the remote wireless device if the new MIC of the request message is not equal to the received MIC of the request message, and the procedure returning to block (a1);
(a4) generating a random nonce "RNonce" of the remote wireless device if the new MIC of the request message is equal to the received MIC of the request message, and storing the random nonce "PNonce" of the user device of the request message packet in the remote wireless device.

13. The remote wireless device according to claim 12, wherein block (b) comprises:
(b1) calculating a pairwise transient key (PTK) of the remote wireless device using a pseudo random function (PRF) according to parameters of the PMK and the random nonce "RNonce" of the remote wireless device, and the random nonce "PNonce" of the user device in the request message packet;
(b2) calculating a key stream of the remote wireless device using the PRF according to parameters of the PTK of the remote wireless device, the random nonce "PNonce" of the user device in the request message packet, and the random nonce "RNonce" of the remote wireless device, sampling previous sixteen bytes from the key stream so as to obtain a MIC key of the remote wireless device, and setting SNr=SNp+1;
(b3) constructing a reply message, and calculating a MIC of the reply message using the HMAC-MD5 algorithm according to parameters of the PMK of the remote wireless device and the replay message;
(b4) sending a reply message packet to the user device, and setting a time out value as t2, wherein the reply message packet comprises the reply message, the sequence number "SNr", and the random nonce "RNonce" of the remote wireless device, and the MIC of the reply message.

14. The remote wireless device according to claim 13, wherein block (c) comprises:
(c1) determining if a control message packet is received within the time out value t2, and the procedure going to block (b4) if the control message packet is received within the time out value t2, or the procedure returning to block (a1) if the control message packet is not received within the time out value t2, wherein the control message packet comprises a control message, a sequence number "SNp", and a random nonce "PNonce" of the user device, and a MIC of the control message;
(c2) determining if the random nonce of the user device in the control message packet is equal to the random nonce of the user device in the request message packet, and the procedure going to block (c4) if the random nonce of the user device in the control message packet is equal to the random nonce of the user device in the request message packet, or the procedure going to block (c3) if the random nonce of the user device in the control message packet is not equal to the random nonce of the user device in the request message packet;
(c3) discarding the control message packet by the remote wireless device, and the procedure returning to block (c1);
(c4) determining if the sequence number "SNp" of the user device in the control message packet is equal to "SNr+1", and the procedure going to block (c5) if "SNp=SNr+1", or the procedure going to block (c3) if "SNp≠SNr+1";
(c5) calculating a new MIC of the control message using the HMAC-MD5 algorithm according to parameters of the MIC key of the remote wireless device and the received control message, determining if the new MIC of the control message is equal to the received MIC of the control message, and the procedure going to block (c6) if the new MIC of the control message is equal to the received MIC of the control message, or the procedure going to block (c3) if the new MIC of the control message is not equal to the received MIC of the control message;
(c6) determining if the control message is a Fin message, and the procedure going to block (d) if the control message is not the Fin message, or the procedure returning to block (a1) if the control message is the Fin message.

15. The remote wireless device according to claim 14, wherein block (d) comprises:
(d1) decrypting a data field of the control message, setting the sequence number "SNr" of the remote wireless device to "SNr+2", constructing an acknowledgment (ACK) message, calculating a MIC of the ACK message using the HMAC-MD5 algorithm according to parameters of the MIC key of the remote wireless device and the ACK message;

(d2) sending an ACK message packet to the user device, and waiting for a next control message packet, wherein the ACK message packet comprises the ACK message, the sequence number "SNr", and the random nonce "RNonce" of the remote wireless device, and the MIC of the ACK message.

\* \* \* \* \*